United States Patent
Obaidi

(10) Patent No.: US 11,601,787 B2
(45) Date of Patent: Mar. 7, 2023

(54) USING A BLOCKCHAIN TO DETERMINE TRUSTWORTHINESS OF MESSAGES BETWEEN VEHICLES OVER A TELECOMMUNICATIONS NETWORK

(71) Applicant: T-Mobile USA, Inc., Bellevue, WA (US)

(72) Inventor: Ahmad Arash Obaidi, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 861 days.

(21) Appl. No.: 16/237,634

(22) Filed: Dec. 31, 2018

(65) Prior Publication Data
US 2020/0213826 A1    Jul. 2, 2020

(51) Int. Cl.
| H04W 4/46 | (2018.01) |
| G08G 1/0967 | (2006.01) |
| H04L 9/32 | (2006.01) |
| H04L 9/06 | (2006.01) |

(52) U.S. Cl.
CPC ........ *H04W 4/46* (2018.02); *G08G 1/096791* (2013.01); *H04L 9/0637* (2013.01); *H04L 9/3265* (2013.01)

(58) Field of Classification Search
CPC . H04W 4/46; G08G 1/096791; H04L 9/0637; H04L 9/3265; H04L 9/3297; H04L 9/3239; H04L 2209/38; H04L 2209/84
See application file for complete search history.

(56) References Cited

U.S. PATENT DOCUMENTS

| 8,918,645 | B2 | 12/2014 | Evans et al. |
| 9,516,053 | B1 | 12/2016 | Muddu et al. |
| 9,985,984 | B1 | 5/2018 | Chavez et al. |
| 10,310,505 | B1 * | 6/2019 | Hanson ............... G05D 1/0274 |
| 11,039,317 | B2 | 6/2021 | Obaidi |
| 11,159,945 | B2 | 10/2021 | Obaidi |
| 11,329,982 | B2 | 5/2022 | Obaidi |
| 2006/0230289 | A1 | 10/2006 | Fox et al. |
| 2007/0291945 | A1 | 12/2007 | Chuang et al. |

(Continued)

FOREIGN PATENT DOCUMENTS

| CN | 104854893 A | 8/2015 |
| CN | 107508859 A | 12/2017 |

(Continued)

OTHER PUBLICATIONS

International Searching Authority, International Search Report and Written Opinion, PCT Patent Application PCT/US2019/068429, dated May 1, 2020, 11 pages.

(Continued)

*Primary Examiner* — Abu S Sholeman
(74) *Attorney, Agent, or Firm* — Perkins Coie LLP

(57) ABSTRACT

Systems and methods are described herein for configuring vehicles and infrastructure (e.g., buildings, smart homes, traffic devices, utilities and associated systems, emergency response systems, and so on) to include blockchain nodes, so a smart city or area of the various devices can be supported by a blockchain network, with some or all devices and systems provisioned with nodes acting as distributed nodes for the blockchain network.

20 Claims, 8 Drawing Sheets

(56) References Cited

U.S. PATENT DOCUMENTS

| | | |
|---|---|---|
| 2014/0220966 A1* | 8/2014 | Muetzel ............... H04L 12/189 |
| | | 455/456.3 |
| 2015/0135283 A1 | 5/2015 | Tofighbakhsh |
| 2016/0283920 A1 | 9/2016 | Fisher et al. |
| 2017/0243212 A1 | 8/2017 | Castinado et al. |
| 2017/0353496 A1 | 12/2017 | Pai et al. |
| 2017/0364698 A1 | 12/2017 | Goldfarb et al. |
| 2018/0091596 A1 | 3/2018 | Alvarez et al. |
| 2018/0122237 A1 | 5/2018 | Nascimento et al. |
| 2018/0219893 A1 | 8/2018 | Li et al. |
| 2018/0225693 A1 | 8/2018 | Postrel |
| 2018/0248896 A1 | 8/2018 | Challita et al. |
| 2018/0287780 A1 | 10/2018 | Safford et al. |
| 2018/0293557 A1 | 10/2018 | Kim et al. |
| 2018/0337769 A1 | 11/2018 | Gleichauf |
| 2018/0342036 A1* | 11/2018 | Zachary ............... H04L 9/0637 |
| 2018/0365397 A1 | 12/2018 | Viscarola et al. |
| 2018/0372502 A1* | 12/2018 | Ronnow ............ G01C 21/3446 |
| 2018/0376305 A1 | 12/2018 | Ramalho De Oliveira |
| 2019/0058697 A1 | 2/2019 | Chang et al. |
| 2019/0093215 A1* | 3/2019 | Kang .................... C23C 16/52 |
| 2019/0104196 A1 | 4/2019 | Li et al. |
| 2019/0182284 A1 | 6/2019 | Signorini et al. |
| 2019/0199756 A1 | 6/2019 | Correnti et al. |
| 2019/0215159 A1 | 7/2019 | Notani |
| 2019/0245697 A1* | 8/2019 | El Abed ................. H04L 63/12 |
| 2019/0259274 A1* | 8/2019 | Avery ..................... H04W 4/46 |
| 2019/0268284 A1 | 8/2019 | Karame et al. |
| 2019/0268466 A1* | 8/2019 | Inoue ................... H04L 9/3247 |
| 2019/0303942 A1 | 10/2019 | Balaraman et al. |
| 2019/0340269 A1 | 11/2019 | Biernat et al. |
| 2019/0361917 A1 | 11/2019 | Tran et al. |
| 2019/0373472 A1 | 12/2019 | Smith et al. |
| 2019/0380037 A1 | 12/2019 | Lifshitz et al. |
| 2019/0386969 A1* | 12/2019 | Verzun ................. H04L 9/0662 |
| 2019/0392536 A1 | 12/2019 | Rice |
| 2020/0004854 A1 | 1/2020 | Inturi et al. |
| 2020/0014720 A1 | 1/2020 | Giura |
| 2020/0020038 A1 | 1/2020 | Haile et al. |
| 2020/0042012 A1* | 2/2020 | Zander .................. G01C 21/36 |
| 2020/0045119 A1 | 2/2020 | Weldemariam et al. |
| 2020/0099531 A1 | 3/2020 | Chidambaram et al. |
| 2020/0099698 A1 | 3/2020 | Kundu et al. |
| 2020/0112432 A1 | 4/2020 | Iwama et al. |
| 2020/0117690 A1 | 4/2020 | Tran et al. |
| 2020/0118131 A1 | 4/2020 | Diriye et al. |
| 2020/0145234 A1 | 5/2020 | Nishijima |
| 2020/0160330 A1 | 5/2020 | Yan |
| 2020/0186527 A1 | 6/2020 | Delson et al. |
| 2020/0213305 A1 | 7/2020 | Obaidi et al. |
| 2020/0213852 A1 | 7/2020 | Obaidi |
| 2020/0213857 A1 | 7/2020 | Obaidi |
| 2020/0389294 A1 | 12/2020 | Soundararajan et al. |
| 2021/0037013 A1 | 2/2021 | Salkintzis |
| 2021/0049477 A1 | 2/2021 | Sakae et al. |
| 2021/0274350 A1 | 9/2021 | Obaidi |
| 2022/0014922 A1 | 1/2022 | Obaidi |

FOREIGN PATENT DOCUMENTS

| | | |
|---|---|---|
| CN | 108234456 A | 6/2018 |
| CN | 108681965 A | 10/2018 |
| CN | 108833081 A | 11/2018 |
| CN | 108881233 A | 11/2018 |
| EP | 3285248 A1 | 2/2018 |
| WO | 2018014123 A1 | 1/2018 |
| WO | 2018033309 A1 | 2/2018 |
| WO | 2018126029 A2 | 7/2018 |

OTHER PUBLICATIONS

International Searching Authority, International Search Report and Written Opinion, PCT Patent Application PCT/US2019/068433, dated Apr. 29, 2020, 9 pages.

European Patent Office, Extended European Search Report, EP Patent Application 19907507.8, dated Aug. 11, 2022, 10 pages.

Jover, Roger Piqueras et al. "dHSS—Distributed Peer-to-Peer Implementation of the LTE HSS Based on the Bitcoin / Namecoin Architecture," 2016 IEEE International Conference on Communications Workshops, May 23, 2016, pp. 354-359.

Supplementary European Search Report for EP19907420.4 dated Dec. 5, 2022, 11 pages.

* cited by examiner

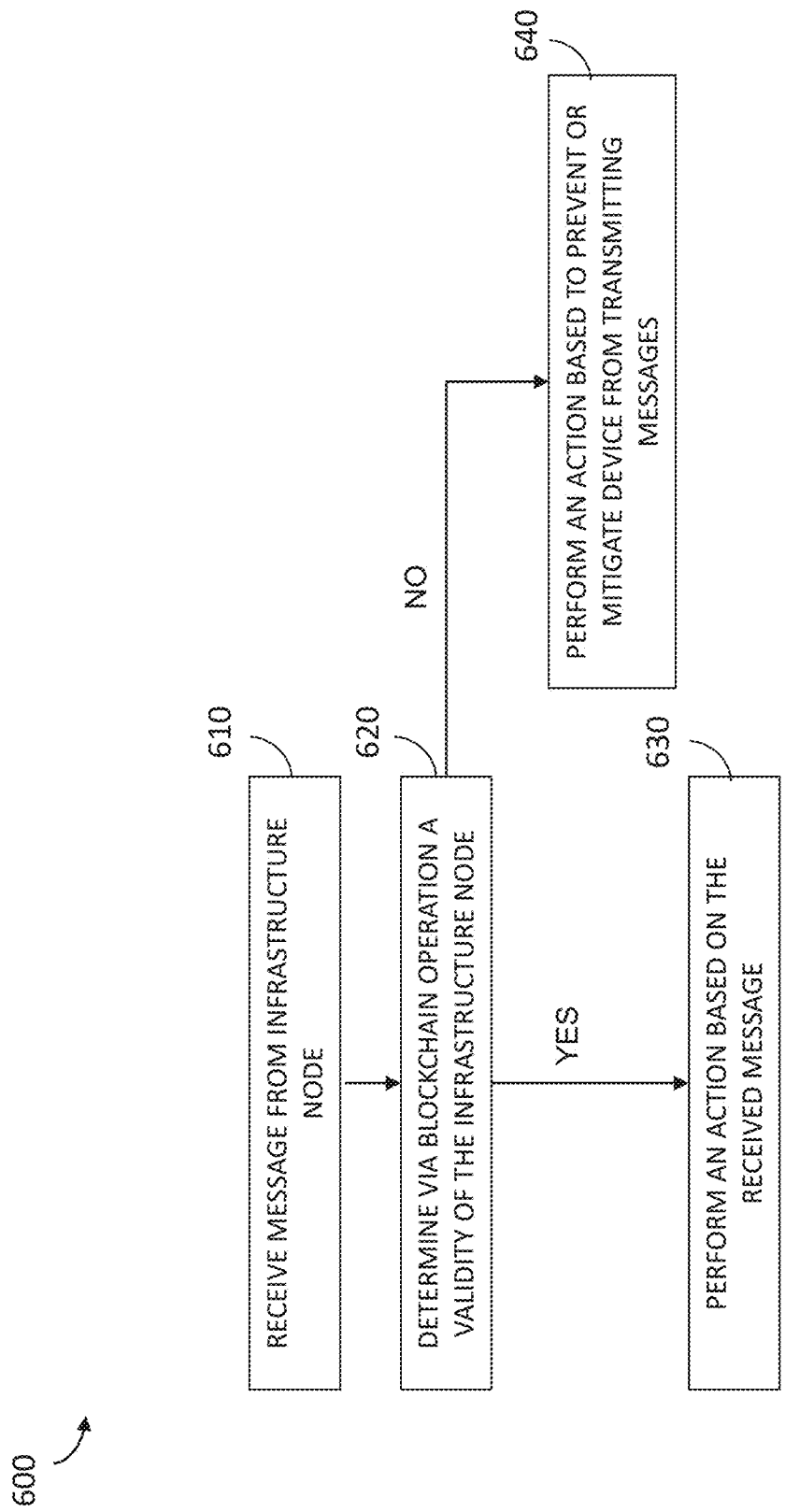

USING A BLOCKCHAIN TO DETERMINE TRUSTWORTHINESS OF MESSAGES BETWEEN VEHICLES OVER A TELECOMMUNICATIONS NETWORK

CROSS REFERENCE TO RELATED APPLICATIONS

This application is related to U.S. patent application Ser. No. 16/237,638, filed on Dec. 31, 2018, entitled MANAGING INTERNET OF THINGS DEVICES USING BLOCKCHAIN OPERATIONS, U.S. patent application Ser. No. 16/237,626, filed on Dec. 31, 2018, entitled USING A BLOCKCHAIN TO DETERMINE TRUSTWORTHINESS OF MESSAGES WITHIN A TELECOMMUNICATIONS NETWORK FOR A SMART CITY, and U.S. patent application Ser. No. 16/237,607, filed on Dec. 31, 2018, entitled PROTECTING A TELECOMMUNICATIONS NETWORK USING NETWORK COMPONENTS AS BLOCKCHAIN NODES, all of which are hereby incorporated by reference in their entirety.

BACKGROUND

Various types of networks, including wireless networks, cellular networks, and other types of telecommunications networks, provide people across the world with communication services. For example, in most locations around the world, a user of a mobile device can access a network and communicate with other users or systems, either via voice calls, text messages, or data over the Internet. These networks, and their entrenched ubiquity, have connected users to many different users as well as to vast troves of information and services. Telecommunications networks, arguably, have made the world better for people.

However, such networks include various physical and virtual vulnerabilities, and a small minority of people will try and take advantage of these vulnerabilities to profit from fraudulent and other deceitful acts. Therefore, network providers will continue to improve the telecommunications networks, their components, and/or devices and systems that utilize the networks, with technology capable of preventing or deterring nefarious actors from attempting to exploit the network weaknesses.

BRIEF DESCRIPTION OF THE DRAWINGS

Embodiments of the present technology will be described and explained through the use of the accompanying drawings.

FIG. 6 is a flow diagram illustrating a method of performing actions based on information received from an infrastructure system or device.

Figure 1:
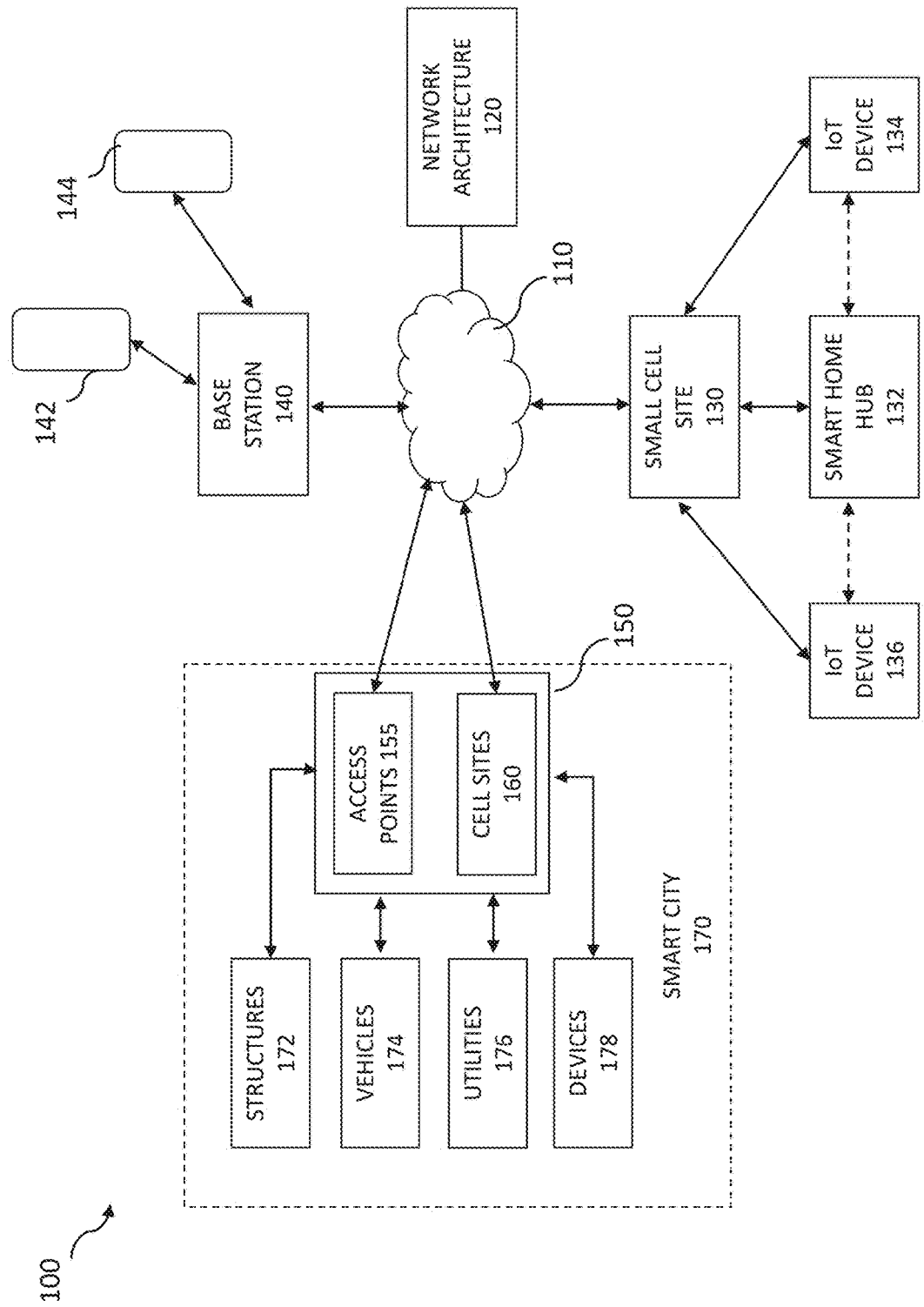
FIG. 1 is a block diagram illustrating a suitable network environment of devices and components representing nodes of a blockchain network.

The drawings have not necessarily been drawn to scale. Similarly, some components or operations can be separated into different blocks or combined into a single block for discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Overview

Systems and methods are described herein for providing blockchain functionality to a telecommunications network, its components, and devices and systems that communicate over the telecommunications network. The systems and methods (collectively, "systems") can implement devices, systems, components, and so on with agents or other modules that transform or establish them as nodes (or sub-nodes) distributed across a network, such as nodes of a blockchain network.

For example, vehicles and infrastructure (e.g., buildings, smart homes, traffic devices, utilities and associated systems, emergency response systems, and so on) can be configured to include blockchain nodes, such that a smart city or area can be supported by a blockchain network, with any devices and systems provisioned with nodes acting as distributed nodes for the blockchain network.

By utilizing aspects of a blockchain network, the smart city or area can self-regulate or self-manage operations within the network. Thus, the systems and devices can utilize the blockchain to determine when communications between devices are trustworthy (e.g., not compromised and communications are legitimately from the devices), among other benefits.

In some implementations, provisioning vehicles with blockchain nodes can facilitate reliable and trustworthy communications between the vehicles (e.g., V2V communications), and/or communications between vehicles and infrastructure systems to devices (e.g., V2X communications).

For example, the systems receive, at a blockchain node within a computing system of a vehicle, a message from another vehicle within a vicinity of the vehicle, where the message from the other vehicle includes information associated with a route currently traveled by the vehicle. The systems then determine, via a blockchain operation performed by the blockchain node, whether the other vehicle is verified on a blockchain associated with a telecommunications network that facilitates communications between the vehicle and the other vehicle. When the other vehicle is verified by the blockchain operation, the systems perform an action associated with the vehicle based on the information associated with the route currently traveled by the vehicle.

Thus, vehicles, including autonomous vehicles, can include a system within a connected area network of the vehicle that includes a blockchain node. The node determines, based on information maintained by a blockchain for a telecommunications network, whether signals sent to the autonomous vehicle from one or more devices in a vicinity of the autonomous vehicle are trustworthy signals. An action module then causes an action associated with the vehicle to be performed in response to the signals from the one or more devices when the blockchain node determines that the signals are trustworthy.

Provisioning infrastructure devices and systems with blockchain nodes can facilitate reliable and trustworthy communications between various entities associated with the infrastructure devices and systems (e.g., emergency response systems, security systems, and so on), and recipients of messaging and other communications (e.g., end users or devices).

For example, the systems receive, at a blockchain node of a computing device, an alert from an infrastructure device, where the alert from the infrastructure device includes information identifying an abnormal condition at the infrastructure device. The systems then determine, via a blockchain operation performed by the blockchain node, whether the infrastructure device is verified on a blockchain associated with a telecommunications network that facilitates communications between the computing device and the infrastructure device. When the infrastructure device is determined to be verified by the blockchain operation, the systems perform an action to respond to the alert from the infrastructure device.

Thus, a computing device can include a system for monitoring operations of devices within a smart city. The system can include a blockchain node, contained by a device within the smart city, that determines, based on information maintained by a blockchain for a telecommunications network associated with the smart city, whether signals sent to device from other devices within the smart city are trustworthy signals. Further, the system can include an action module that causes certain actions to be performed in response to the signals from the other devices when the blockchain node determines that the signals are trustworthy.

Therefore, the systems can provision some or all devices and systems of an area or city with blockchain nodes, in order to build, manage, and utilize a blockchain or distributed ledger for the area or city when determining whether communications (e.g., messages or data communications) are trustworthy and sent from known and reliable devices or systems, among other benefits.

In the following description, for the purposes of explanation, numerous specific details are set forth in order to provide a thorough understanding of embodiments of the present technology. It will be apparent, however, that embodiments of the present technology can be practiced without some of these specific details.

Examples of Telecommunication Networks as Blockchain Networks of Nodes

As described herein, in some embodiments, the systems manage devices, components, and systems of or associated with a telecommunications network as nodes on a blockchain network. Devices, therefore, functions as nodes (or sub-nodes) that are distributed across the blockchain network.

Nodes on a blockchain network perform various functions for the network. They process transactions and maintain copies (e.g., replicated databases or ledgers) of the blockchain. Thus, the distributed nodes combine to be the blockchain network. For example, with respect to cryptocurrencies (e.g., Bitcoin), the nodes check new currency transactions against a consensus protocol, which is a uniform system of agreement between all the nodes of the network when validating transactions processed by the nodes. Therefore, a node itself, relying on the consensus protocol, determines whether to validate transactions at the node.

There can be different types of nodes, such as full nodes, sub-nodes, and agents. Full nodes maintain a complete copy of every block (e.g., record) and transaction within the blockchain network, and validate the blocks/transactions against the consensus protocol. Sub-nodes and agents, however, can only validate their own transactions. In some cases, a group of sub-nodes or agents can act, together, as a node or full node. Further, nodes, sub-nodes, and agents can act as endpoint nodes (when communications between nodes in the network end or terminate) or as redistribution nodes (where communications are redistributed to other nodes of the network).

Telecommunication networks are well suited to managing communications between components (e.g., devices, cells, access points, registers, databases, gateways, and so on) by representing the components as nodes of blockchain networks. For example, any devices associated with the network, communicating via the network, and/or within or providing the network, can be nodes and function to validate transactions, authenticate other devices, perform actions or operations, or otherwise communicate over the network based on blockchain transactions.

FIG. 1 is a block diagram illustrating a suitable network environment 100 of devices and components representing nodes of a blockchain network. As depicted, a telecommunications network 110 can extend into virtually any area, location, structure, or environment, providing services to devices and systems of all scales—from mobile devices to smart homes and other single structures, to communities, cities, and other groups of structures or devices.

The telecommunications network is provided via a network architecture 120, such as the various components that provide communication services (e.g., voice calls, text and other messaging, data communications, and so on) to mobile devices and other user equipment. As described herein, the network architecture can include access points or networks, gateways, core networks components (e.g., operations components, packet control components, policy control functions, charging components, subscriber databases, and so on), and so on.

Devices, systems, and geographical areas can access the telecommunications network 110 through a variety of different sites, access points, and/or networks. For example, a small cell site (e.g., a femtocell, picocell, or other small cell) 130 can provide access to the network 110 to a small or targeted area, such as a smart home hub 132 and its various connected (internet of things, or IoT) devices 134, 136. The small cell site 130 can provide access to the smart home hub 132 and the devices 134, 136 directly (as well as any mobile devices), or the devices can access the network 110 via the smart home hub 132.

In addition to the small cell site 130, the devices, systems, and/or areas can access the network 110 via base stations or other cell sites, such as base station 140. For example, mobile devices 142, 144 can communicate over the network 110 by accessing the network 110 via the base station 140.

Further, devices, systems, and/or other areas, such as smart cities and their various components and infrastructure can access the network 110 via provisioned access networks 150, such as access networks 150 supported by access points 155 (e.g., wireless access points, hotspots, routers, and so on), or other cell sites 160 (e.g., small cells or base stations positioned to service specific areas or centers).

For example, a smart city 170 can include structures 172 (e.g., houses, buildings, schools, hospitals, and so on) that connect to the network 110 via the access network 150. Vehicles 174 can also access the network 110 vis the access network 150. Further, various utilities 176 and their systems or devices (e.g., electric grid components, water systems, gas or other fuel systems, wireless infrastructure systems, emergency response systems, and so on), can communicate over the network 110. Also, devices 178 (e.g., traffic lights and other devices, street lamps, parking meters, and so on), access the network 110 via the access network 150.

Some or all of these systems and devices 172, 174, 176, 178 can communicate with one another via the network 110. For example, vehicles 174 can communicate with other vehicles 174, or with certain devices 178 (e.g., traffic lights), or with services provided by utilities 176 (e.g., emergency response services), or with structures 172 (e.g., smart home devices) over the network 110. As another example, a utility (e.g., the electric grid) can communicate with other utilities (e.g., the emergency response system), with vehicles 174, and so on.

Thus, in some embodiments, the telecommunications network 110 (managed by the network architecture 120) provides communication services to a wide range of all the different devices and systems capable of communications—from single mobile devices 142, 144 to large-scale connected cities 170 of devices, systems, and structures. Further, although FIG. 1 depicts examples of how these device and systems access the network 110, other configurations are possible. For example, mobile device 142 can access the network 110 via small cell site 130, and IoT device 132 can access the network 110 via the base station 140, among other configurations.

As described herein, some or all of the devices or systems depicted in FIG. 1 or the other Figures can act as or be configured to function as a node or sub-node of a blockchain network. A node or sub-node can be implemented as a module, agent, or another component of a device or system. The agents or modules can be functional modules or engines that are implemented with a combination of software (e.g., executable instructions, or computer code) and hardware (e.g., at least a memory and processor). Accordingly, as used herein, in some examples a module or engine is a processor-implemented module or set of code and represents a computing device having a processor that is at least temporarily configured and/or programmed by executable instructions stored in memory to perform one or more of the particular functions that are described herein.

As nodes (or sub-nodes), the devices or systems function to maintain a distributed ledger (e.g., a blockchain) of transactions. Further, the devices or systems can collaboratively function to validate, verify, certify, or authenticate data and/or transactions communicated between the nodes. Thus, the devices or systems, working as nodes of a blockchain network, operate to provide security, reliability, and/or redundancy between themselves and various portions or segments of the telecommunications network 110.

The blockchain, being associated with the network and various devices or systems, can be configured to track or store information specific to communications over the network. For example, blockchain transactions can include information identifying a location of a user or device (e.g., GPS information, cell tower or base station information, access point information, and so on), device or user identifiers, such as Mobile Station International Subscriber Directory Number (MSISDN) or International Mobile Equipment Identity (IMEI) information, biometric information and other biological or physical user identifiers, and so on.

For example, a device can access a network and run an instance of an Ethereum virtual machine, and utilize various device or network-specific information when authenticating onto the network via various blockchain transactions. The blockchain, tracking and maintaining such information, can then authenticate the device via the information with a high degree of confidence, knowing that the actual device (or the person behind the device) is valid and authorized to access the network.

To that end, the devices or systems, as nodes, can perform specific functions when communicating with other devices or systems, depending on their role within the network 110 or how they are being utilized. For example, a mobile device (e.g., mobile device 142), can act as an endpoint node of a blockchain network, whereas a gateway component of the network architecture 120 can function as a redistribution node.

Figure 2A:
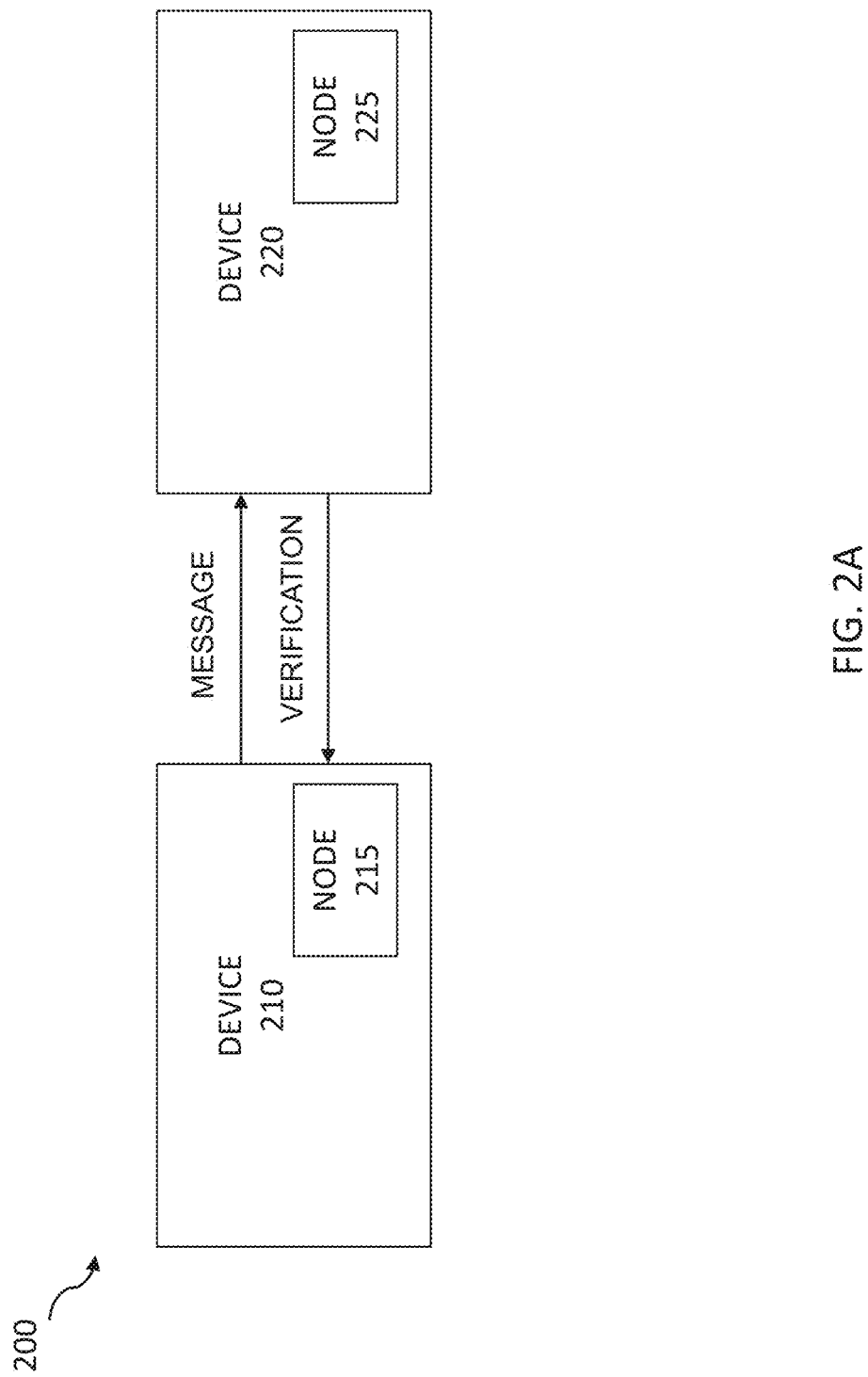
FIG. 2A is a block diagram illustrating communications between two separate devices represented as nodes of a blockchain network.
Figure 2B:
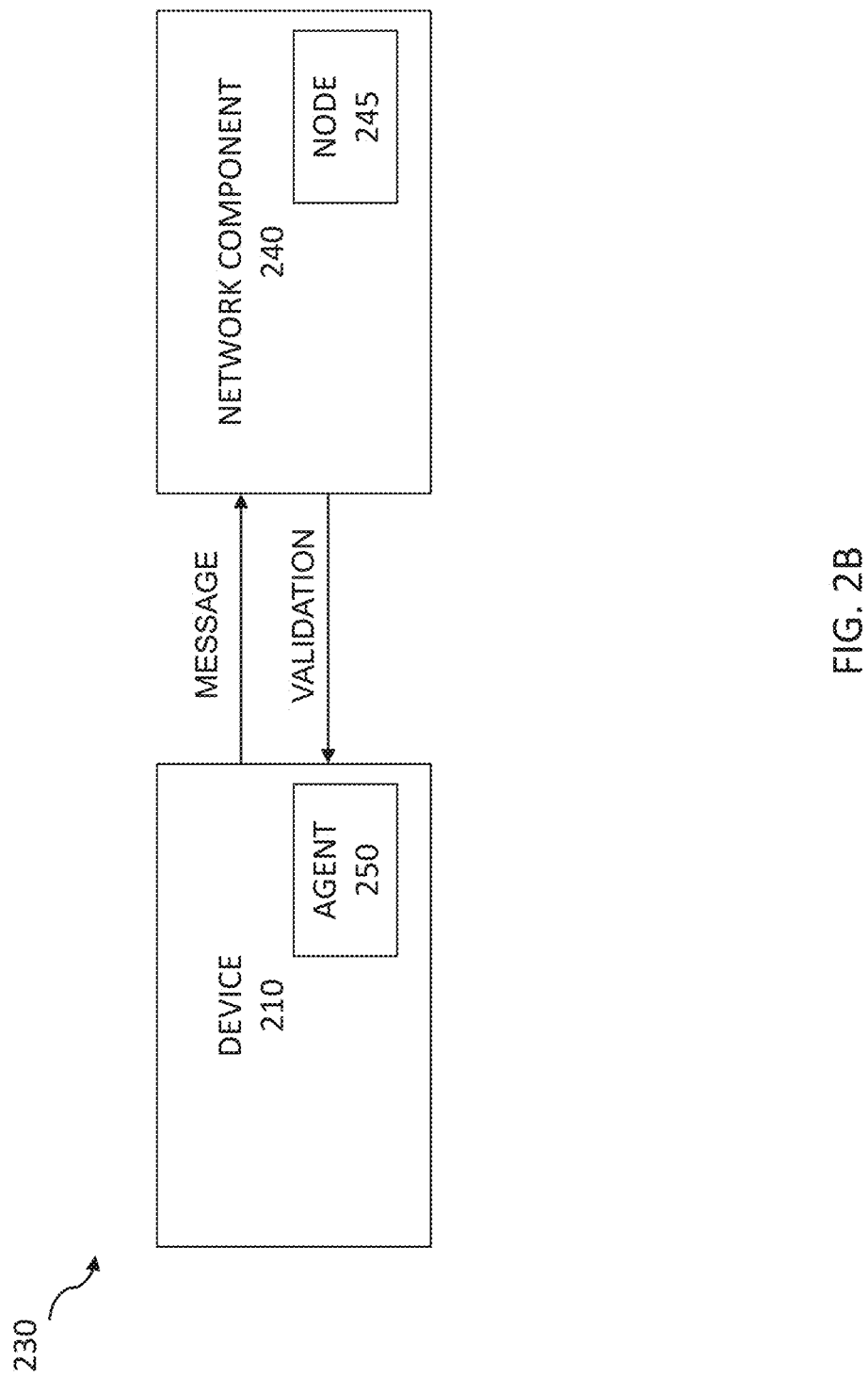
FIG. 2B is a block diagram illustrating communications between a device and a network component, where both are represented as nodes of a blockchain network.
Figure 2C:
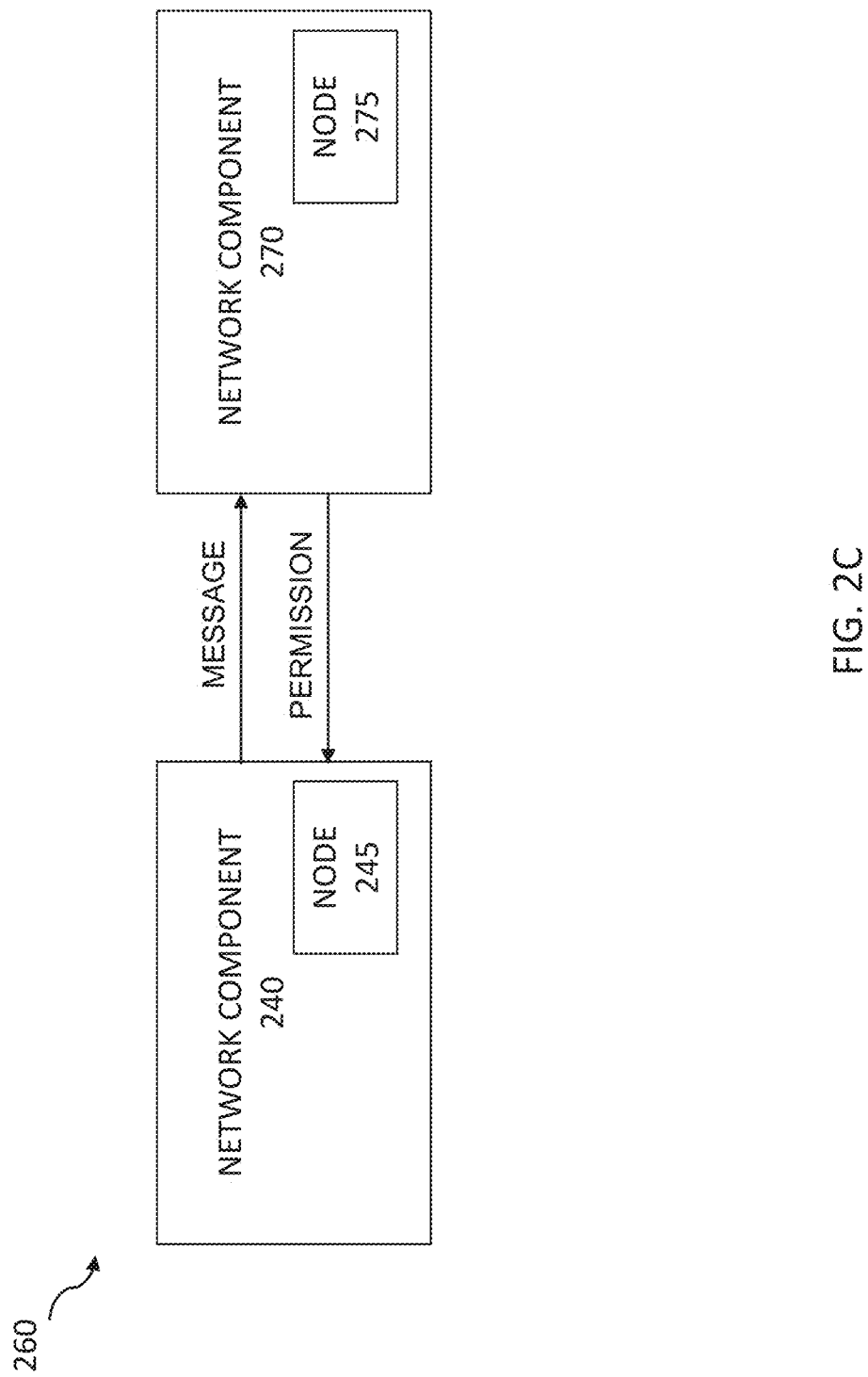
FIG. 2C is a block diagram illustrating communications between network components represented as nodes of a blockchain network.

Following the example, the mobile device, when communicating with other devices, can compare perform blockchain transactions to compare certificates of other devices in communication with the mobile device, whereas the gateway component can maintain a complete ledger of an entire network of blocks or transactions, and allow access to core network components when both requesting device and core network components are verified by the gateway component. FIGS. 2A-2C provide examples of such functionality for different devices, components, or systems.

FIG. 2A is a block diagram illustrating communications 200 between two separate devices represented as nodes of a blockchain network. For example, a device 210 can send a message to a device 220 over the network 110. The device can also send, via a node component 215 or similar agent associated with the device 210, a certificate or other identifier of the device. The device 220, via its node component or agent, can verify the device 210 based on the transmitted certificate.

For example, the device 220 can compare the credentials of the device 210 with one or more previous transactions performed by the device 210 on the network. When the credentials are associated with authenticated or acceptable transactions (or previous verifications), the device 220 verifies the device 210 to the network 110 (enabling the device 210 to utilize all or certain services provided by the network 210). Upon verification, the device 220 can transmit a verification message back to the device 210 (which can add the message to the blockchain via the node 215). Thus, in some embodiments, one device can verify and/or authenticate another device to the network 110 or other devices or systems associated with the network 110 by utilizing blockchain processes.

FIG. 2B is a block diagram illustrating communications 230 between a device and a network component, where both are represented as nodes of a blockchain network. For example, the device 210 can send a message to a network component 240 (e.g., a network component of architecture 120), such as when attempting to access the network 110 via one or more access points. The device 210, via its associated agent 250, transmits information to the network component 240, which compares the information, via its associated blockchain node 245, to records of the blockchain, in order to validate the device 210 to the network 110.

For example, such as process can occur every time the device 210 accesses the network 110, or in response to potential attempts to access the network 110 without permission or knowledge of the various network components 240. Once validated, the node 245 adds a transaction to the blockchain representing activity within the network 110, and the device 210 communicates over the network 110 as requested. Thus, in some embodiments, network components 240 can, at each or some of the components, perform validation processes for a device that attempts to access services provided by the network 210.

FIG. 2C is a block diagram illustrating communications 260 between network components represented as nodes of a blockchain network. At times, one network component 270 can perform various blockchain processes in order to permit another network component (e.g., component 240) to perform its intended functions for the network 110.

For example, the network component 240 can, via its agent 245, send a message to the network component 270 as part of a normal core network function or process. To avoid perpetuating messages from a compromised component, the network component 270 can, via its node 275, compare the message to the blockchain, and give permission for the network component 240 to continue to operate within the network 110. Thus, in some embodiments, the network components themselves can act as nodes of a blockchain in order to maintain the integrity and reliability of operation and processes of the telecommunications network 110.

Thus, in various embodiments, the telecommunications network 110 utilizes the functionality of a distributed ledger to provide various components, devices, or systems with the means to act as authentication, validation, or verification interfaces for the network 110. The following section illustrates details for specific embodiments employing such functionality.

FIG. 1 and the discussion herein provide a brief, general description of a suitable computing environment in which devices and network components function as nodes on a blockchain network can be supported and implemented. Although not required, aspects of the various components or systems are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or another scheme). Portions of the system can reside on a server computer, while corresponding portions can reside on a client computer such as a mobile or portable device, and thus, while certain hardware platforms are described herein, aspects of the system are equally applicable to nodes on a network. In an alternative embodiment, the mobile device or portable device can represent the server portion, while the server can represent the client portion.

In some embodiments, the devices can include network communication components that enable the devices to communicate with remote servers or other portable electronic devices by transmitting and receiving wireless signals using a licensed, semi-licensed, or unlicensed spectrum over communications networks. In some cases, the telecommunication network can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other 3GPP or non-3GPP communications networks.

Examples of Determining Communications Over a Network are Trustworthy

As described herein, in some embodiments, the systems and methods configure devices and systems (such as devices and systems that are part of the smart city 170) to themselves determine whether the communications (e.g., messages, data, voice, and so on), originate or come from trustworthy sources, such as other devices and systems.

Figure 3:
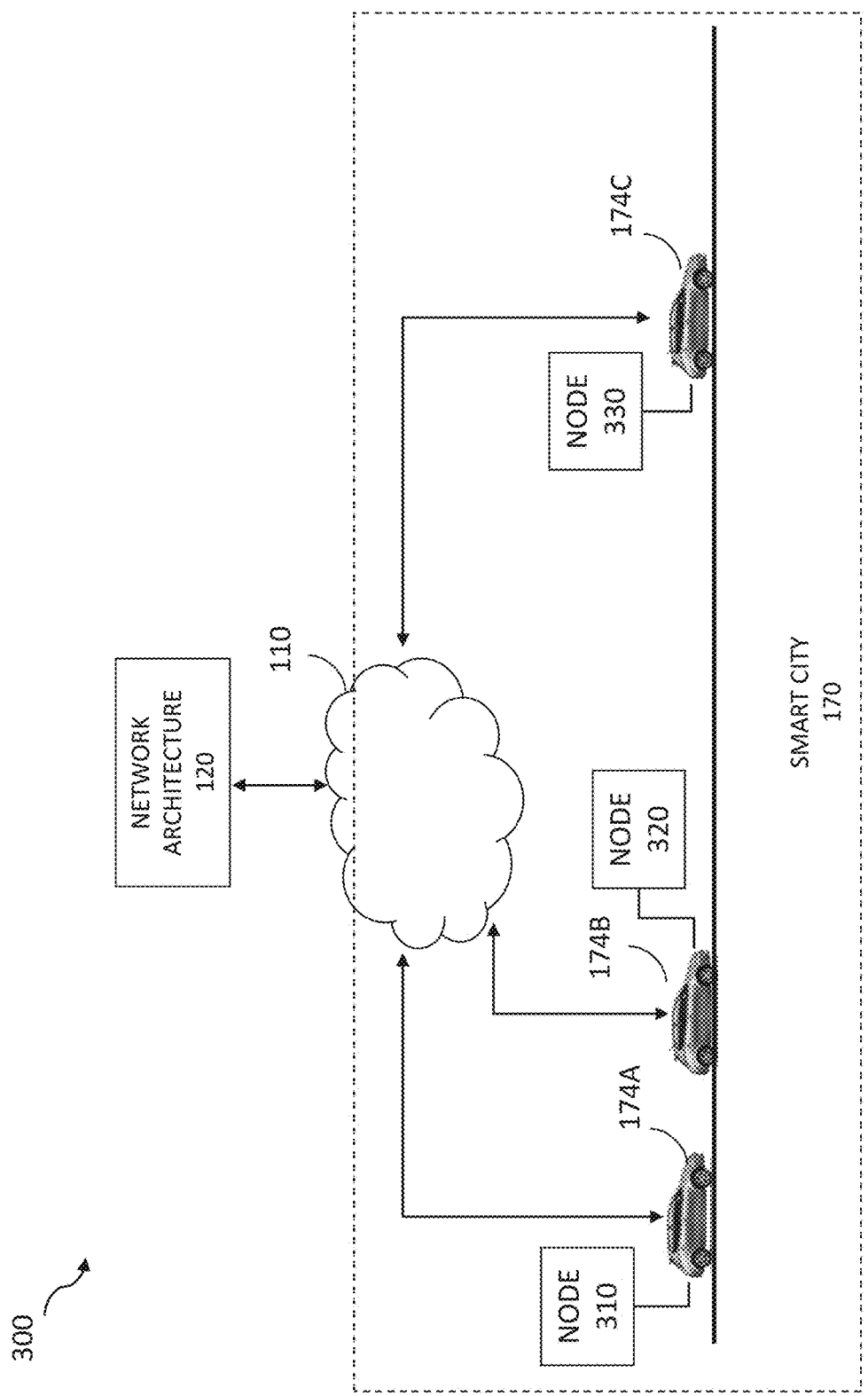
FIG. 3 is a block diagram illustrating a network of vehicles communicating as nodes on a blockchain network.

In some cases, the systems and devices interacting with one another can be vehicles, such as autonomous vehicles, electric vehicles, or any other vehicles that contain a controller area network (CAN) or other computer system or network that manages sensors and controls some or all aspects of the operation of the vehicle. FIG. 3 is a block diagram illustrating a network of vehicles 300 communicating as nodes on a blockchain network.

Vehicles 174A-C can communicate over the telecommunications network 110, provided as a wireless, LTE, IMS, or other type of network by the network architecture 120. The vehicles 174A-C can include computing devices or systems that facilitate connections between the network 110 and the vehicles 174A-C. Thus, in some cases, a vehicle as described herein is a connected vehicle.

As an example, a connected vehicle can connect to the network 110 via one or more network devices attached or provided to the vehicle, such as the T-Mobile® Sync Up Drive™, which connects to an on board diagnostic (OBD) reader, such as via an OBD-II port of a dashboard of the vehicle, or other controller area network (CAN) bus components or devices of the connected vehicle. The attached devices can, for example, collect information and/or diagnose various events, issues, or changing statuses of the vehicle and its components, monitor and track the operation of the vehicle, and so on. The devices and/or internal computing systems, therefore, establish the connected vehicle as a device on the communications network 110.

Of course, other devices can provide similar information associated with the connected vehicle, such as a mobile device associated with drivers of the vehicles (e.g., who can be subscribers of the network 110), subscriber identity modules (SIM), such as eSIMs (or other dynamically reprogrammable modules), integrated with the vehicles, and/or other communication components that are part of the vehicles and/or devices within the vehicles and configured to communicate over the communications network 110.

In some cases, the vehicles 174A-C can include various sensors than facilitate the capturing of information associated with the vehicles and their surroundings. The vehicles 174A-C can include ultrasonic sensors, radar sensors, imaging sensors, GPS or accelerometers, and so on.

The vehicles can also include vehicle-to-vehicle communication (V2V) components, which enable vehicles to communicate with one another (in real-time), such as relay information from one vehicle to another. For example, the vehicle 174C can be further ahead on a route of travel, and relay information 174A back to the vehicle 174C that identifies potential issues encountered along the route—traffic, environmental conditions, vehicle movements (e.g., lane changes), vehicle problems (e.g., notification of a flat tire), and so on. Some example V2V applications include Intersection Movement Assist (IMA) applications, Left Turn Assist (LTA) applications, and so on.

Autonomous vehicles, in some cases, can be specifically reliant, and therefore vulnerable, to communications between vehicles that are untrustworthy, or unreliable, such as communications sent by compromised vehicles (or compromised systems within the vehicles).

Therefore, as described herein, the systems my provision or equip the vehicles 174A-C with nodes 310, 320, and 330, which perform blockchain operations to determine whether communications received from other vehicles are reliable and come from trustworthy sources.

As depicted, some or all of the vehicles 174A-C that communicate over the network 110 can be configured or provisioned to include a blockchain node, such as a node that includes a blockchain agent configured to perform blockchain transactions, operations, or other processes associated with a blockchain or ledger, which tracks and maintains a history of all transactions performed within the telecommunications network 110 by the vehicles 174A-C.

In some embodiments, the nodes are implemented as JavaScript modules (e.g., "Node.js"), or other similar modules (e.g., Solidity modules) and the ledger or blockchain is configured as JavaScript array. Thus, each vehicle 174A-C can include a blockchain node. A vehicle, having a blockchain node, is capable of accessing a full copy of the blockchain representing the network 110, performing operations associated with the blockchain, and adding transaction data (e.g., blocks) to the blockchain associated with activities and actions performed by the vehicle and/or other vehicles of the network 110.

Figure 4:
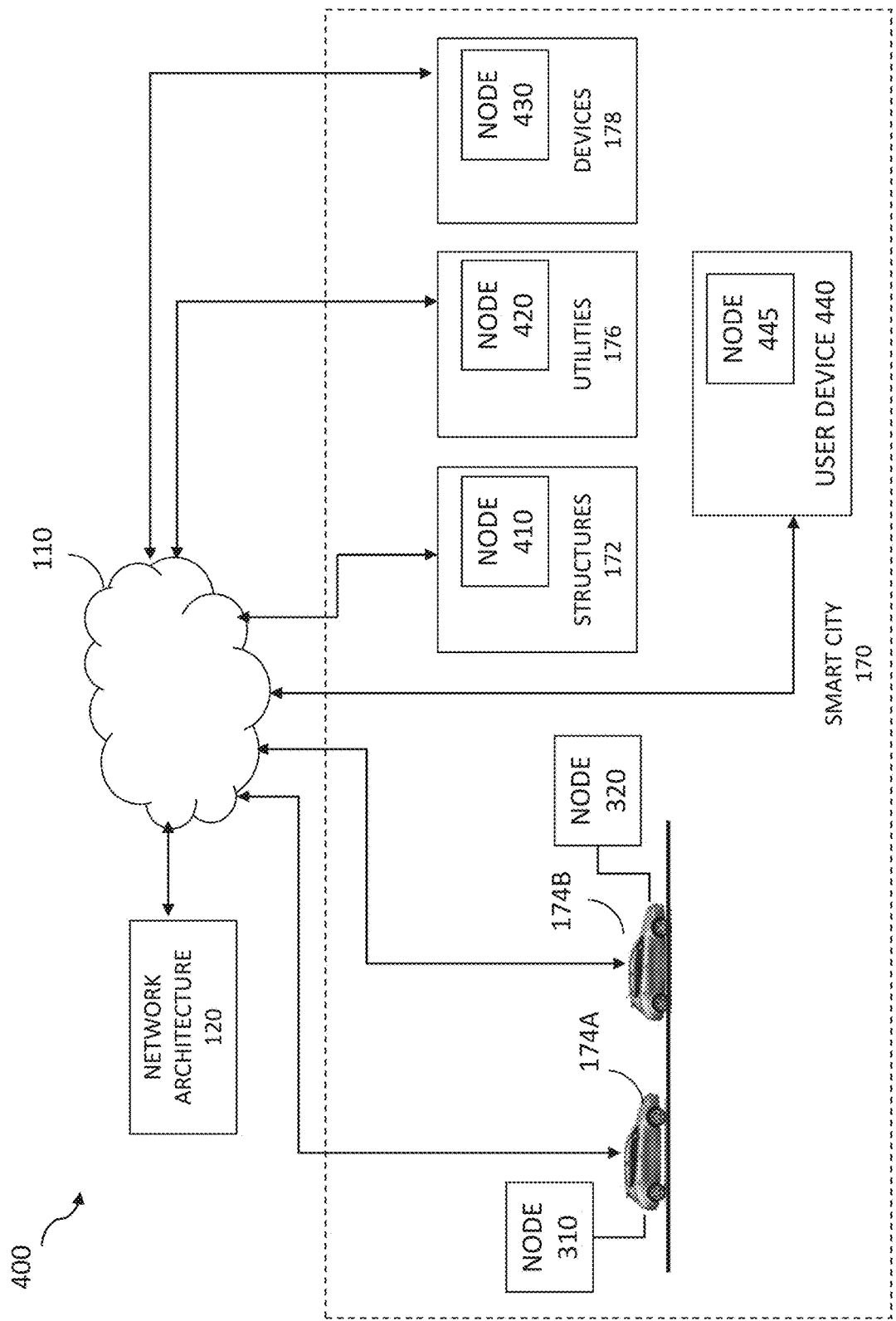
FIG. 4 is a block diagram illustrating a network of vehicles and infrastructure communicating as nodes on a blockchain network.

In addition to vehicles 174A-C, the smart city 170 can include various infrastructure entities. FIG. 4 is a block diagram illustrating a network of vehicles and infrastructure 400 communicating as nodes on a blockchain network.

The network 400 includes the structures 172, utilities 176, and devices 178 described herein. For example, pole stations, traffic signals, and other smart road or smart city devices 178 (e.g., such as 5G micro base stations placed in buildings, on utility poles, and so on) can be connected to the network 110, and facilitate exchanges of information between the vehicles 174A-C and the network 110. Similarly, one or more networked devices can communicate with a vehicle when it is parked at home, in a parking garage, or in a parking space. Therefore, in some cases, a vehicle can encounter and exchange information with various networked devices when travelling, and the devices provide the access to the communications network 110.

Further, the infrastructure entities can communicate, over the network 110, with a user device 440, such as a mobile device, laptop, tablet, and so on, associated with a user and configured to monitor, track, analyze, and/or provide a status about operations at the entities and/or other information associated with the structures 172, vehicles 174, utilities 176, devices 178, and so on, of the smart city 170.

For example, one or more devices 178, such as utility meters (e.g., automatic meter reading (AMR) devices) can send information over the network 110 to the user device 440 that indicates consumption of a utility, status of operation of a utility at a structure 172, and so on. Other devices 178 can send status information, alerts, or other signals, such as alerts that indicate an emergency at a location or area, signals that provide information to other devices 178, vehicles, and so on, or other information or data.

For example, with respect to vehicles, the network 110 can facilitate vehicle-to-everything (V2X) communications, such as communications between the vehicles 174A-C and pedestrians (e.g., at user device 440), roadway or traffic devices (e.g., traffic signals such as smart signals, stoplights, digital signs, lighting, parking meters, charging systems, and other smart devices or systems along a route of travel), and so on.

In addition, the infrastructure entities can include smart grid components (e.g., power stations, transformers, and so on, network infrastructure components, light poles), retail environments, emergency response devices, systems, or entities, cameras, smart home or building sensors (e.g. temperature sensors, gas or fire alarms, and so on), campus or area grid systems, and so on.

As described herein, the systems my provision or equip the infrastructure entities with nodes 410, 420, and 430, as well as the user device with node 445. The nods 410, 420, 430, 445 can perform blockchain operations to determine whether communications between entities are trustworthy and not originating from compromised entities (e.g., poison pill entities) that can harm the network 110 or the infrastructure entities.

The nodes 410, 420, 430, 445 include a blockchain agent configured to perform blockchain transactions, operations, or other processes associated with a blockchain or ledger, which tracks and maintains a history of some or all transactions performed within the telecommunications network 110 within the smart city 170.

As described herein, in some embodiments, the nodes are implemented as JavaScript modules (e.g., "Node.js"), or other similar modules (e.g., Solidity modules) and the ledger or blockchain is configured as JavaScript array. Thus, each vehicle 174A-C can include a blockchain node. A system or device, having a blockchain node, is capable of accessing a full copy of the blockchain representing the network 110, performing operations associated with the blockchain, and adding transaction data (e.g., blocks) to the blockchain associated with activities and actions performed by the systems and devices of the network 110.

Thus, as depicted in FIGS. 3 and/or 4, the systems facilitate the managing and verifying of communications between vehicles and/or infrastructure over the communications network 110 by utilizing the vehicles 174A-C and infrastructure systems and devices 172, 174, 176, 178 as distributed nodes of a blockchain.

Figure 5:
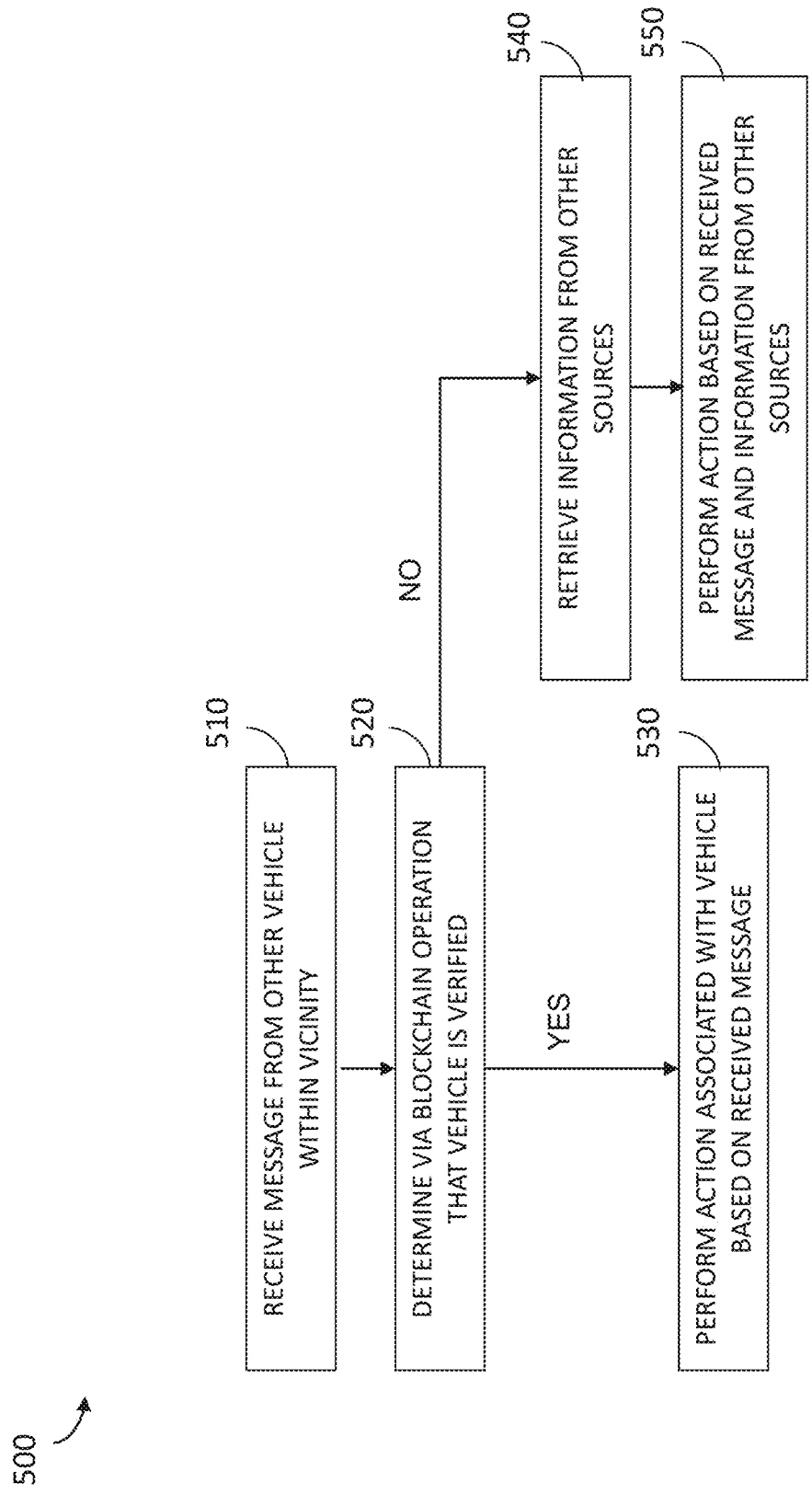
FIG. 5 is a flow diagram illustrating a method of performing actions for a vehicle based on messages received from other vehicles.

FIG. 5 is a flow diagram illustrating a method of performing actions for a vehicle based on messages received from other vehicles. The method 500 can be performed by a blockchain node of a vehicle 174A-C (e.g., nodes 310, 320, 330), and, accordingly, is described herein merely by way of reference thereto. It will be appreciated that the method 500 can be performed on any suitable hardware or network component.

In operation 510, the blockchain node of a vehicle (e.g., a node contained by a CAN of a vehicle) receives a message from another vehicle within a vicinity of the vehicle. For example, the node can receive a message from another vehicle that includes information associated with a route currently traveled by the vehicle, or other vehicle-to-vehicle communications, as described herein.

Example messages, contents, or information that can be transmitted between vehicles includes information identifying a current traffic condition on the route of travel, a current weather condition on the route of travel, vehicle movement information, and so on.

For example, when the vehicles are autonomous vehicles, the information can include lane assist information, intersection movement assist information, left turn assist information, or other information or data for the other vehicle that identifies, to the vehicle, the movements of the other vehicle along the route of travel.

In operation 520, the blockchain node determines, via a blockchain operation performed by the blockchain node, whether the other vehicle is verified on a blockchain associated with a telecommunications network that facilitates communications between the vehicle and the other vehicle. For example, the node can perform an operation associated with a blockchain for the network 110 to compare or otherwise identify blocks or transactions associated with the other vehicle that can be able to provide information that verifies the other vehicle as being legitimate, trustworthy, and/or non-compromised (e.g., operating as intended).

In some embodiments, the node can determine or place certain vehicles on a white list, gray list, or black list, depending upon the information contained on the blockchain for the vehicle. For example, when a blockchain operation indicates a vehicle has been stolen, the vehicle is placed on a blacklist, when a blockchain operation indicates a vehicle has not certified (via the blockchain or via one or more motor vehicle entities) within a certain time period, the vehicle is placed on a gray list, and when a vehicle has provided a root certificate or other verifiable information, the vehicle is on a white list.

Thus, in some cases, the blockchain operation can compare contents of the message received from the other vehicle with contents of previous messages transmitted from the other vehicle and contained by the blockchain, compare identification information for the other vehicle within contents of the message received from the another vehicle with identification information within contents of previous messages transmitted from the other vehicle and contained by the blockchain, determine that the other vehicle is verified when information within the message matches information contained by transactions of the blockchain that are associated with the other vehicle, and so on.

In operation 530, when the other vehicle is determined to be verified by the blockchain operation, the computing system of the vehicle performs an action (or, causes an action to be performed), associated with the vehicle based on the information associated with the route currently traveled by the vehicle. For example, the vehicle can change lanes, slow down or decelerate, speed up or accelerate, adjust or modify a planned route of travel, and so on.

In operation 540, when the other vehicle is determined not to be verified by the blockchain operation, the node retrieves route information from other sources (e.g., other devices connected to the vehicle via the network 110). For example, the node can request information from the other sources (e.g., traffic devices, other vehicles, and so on), in order to confirm or supplement information received from the unverified other vehicle.

In some cases, the node can pause or prevent performance of an action associated with the vehicle based on the information associated with the route currently traveled by the vehicle until the information is confirmed by an additional source of information.

In operation 550, the computing system of the vehicle performs (or causes to be performed) the action associated with the vehicle based on the information associated with the route currently traveled by the vehicle and retrieved from the other sources. For example, similar to operation 530, the vehicle can change lanes, slow down or decelerate, speed up or accelerate, adjust or modify a planned route of travel, and so on.

Once or during performance of the action, the node, in some cases, can perform a transaction to the blockchain that includes a hash of a previous block in the blockchain, a timestamp for the transaction, and transaction data that identifies the action performed by the vehicle and information identifying the other vehicle that sent the message.

Thus, in some embodiments, the systems utilize blockchain nodes to verify V2V communications, V2X communications, and so on. As described herein, any vehicle can operate a distributed node of a blockchain, configured as a system within a computer area network of a vehicle (e.g., an autonomous vehicle) that includes a blockchain node that determines, based on information maintained by a blockchain for a telecommunications network, whether signals or information sent to the autonomous vehicle from one or more devices in a vicinity of the autonomous vehicle are trustworthy signals or information, and an action module that causes performance of an action associated with the vehicle in response to the signals or information from the one or more devices when the blockchain node determines that the signals are trustworthy.

As described herein, in addition to communications between vehicles and other vehicles, systems or devices (V2V and V2X communications), the systems described herein can configure infrastructure entities as distributed nodes of a blockchain associated with the network 110, in order to verify that communications originating from the entities are trustworthy and not compromised, among other benefits.

FIG. 6 is a flow diagram illustrating a method 600 of performing actions based on information received from an infrastructure system or device. The method 600 can be performed by a blockchain node of the infrastructure entities (e.g., nodes 410, 420, 430, 445), and, accordingly, is described herein merely by way of reference thereto. It will be appreciated that the method 600 can be performed on any suitable hardware or network component.

In operation 610, a blockchain node of a computing device receives a message alert from an infrastructure device, where the message from the infrastructure device includes information identifying a current condition at the infrastructure device. For example, the node 445 of the user device 440 can receive an alert from one or more of the structures 172, utilities 176, or other devices 178, where the alert identifies an abnormal condition at the entity.

The alert or other message can indicate, for example, an emergency at a location that includes the infrastructure device, such as a power failure at the area at which power is provided via an electric grid, the triggering of a security alarm, smoke alarm, and so on at a location or within a structure, and so on.

As one example, when the infrastructure device 178 is a utility meter associated with a utility, the information identifying an abnormal condition at the infrastructure device can include information that indicates a failure of one or more components providing the utility (e.g., transmitting such information to an automated meter reading (AMR) device that automatically collects data from the utility meter). As another example, the infrastructure device is an emergency alert device for a location, and the computing device is a mobile device configured to alert an emergency responder of an emergency at the location.

In operation 620, the blockchain node of the computing device determines via a blockchain operation performed by the blockchain node, whether the infrastructure device is verified on a blockchain associated with a telecommunications network that facilitates communications between the computing device and the infrastructure device. For example, the node can perform an operation associated with a blockchain for the network 110 to compare or otherwise identify blocks or transactions associated with the infrastructure device that can be able to provide information that verifies the device as being legitimate, trustworthy, and/or non-compromised (e.g., operating as intended).

Thus, in some cases, the blockchain operation can compare contents of a received message with contents of previous messages transmitted from the device and contained by the blockchain. The operation then compares identification information for the device within contents of the message received from the device with identification information within contents of previous messages transmitted from the device and contained by the blockchain. The operation can then determine that the device is verified when information within the message matches information contained by transactions of the blockchain that are associated with the device, and so on.

When the infrastructure device is determined to be verified by the blockchain operation, the user device, in operation 630, performs (or causes to be performed) an action to respond to the message from the infrastructure device. For example, the user device 445 can automatically respond to the message to mitigate an abnormal condition at the infrastructure device, to alert users (e.g., emergency responders) or send notifications of certain conditions or statuses at a location, and so on.

When the infrastructure device is determined not to be verified by the blockchain operation, the blockchain node of the user device performs an action to prevent or otherwise mitigate the infrastructure device from transmitting additional messages to other computing devices. For example, the node can send messages to other devices to ignore messages from the device, determined to be compromised. The node can also alert a user associated with the user device that the compromised device is transmitting erroneous or nefarious messages to devices over the network 110.

In some cases, the blockchain node of the computing device can perform a transaction to the blockchain that includes a hash of a previous block in the blockchain, a timestamp for the transaction, and transaction data that identifies the action performed to respond to the message from the infrastructure device.

Thus, the systems can configure infrastructure entities as distributed nodes of a blockchain. Each of the structure 172, utilities 176, or devices 178 can include a system for monitoring operations of devices within a smart city, including a blockchain node, contained by a device within the smart city. The system determines, based on information maintained by a blockchain for a telecommunications network associated with the smart city, whether signals sent to device from other devices within the smart city are trustworthy signals. An action module of the system then causes performance of actions associated in response to the signals from the other devices when the blockchain node determines that the signals are trustworthy.

Thus, in some embodiments, the systems enable a smart city to monitor itself by utilizing vehicles and entities within the city (or other location) as distributed nodes of a blockchain. The city can then utilize any node when checking the validity or trustworthiness of communications over a network, and perform actions, when appropriate, to mitigate compromised devices or systems, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed or implemented in parallel, or can be performed at different times. Further any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include not only additional elements to those implementations noted above, but also can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

Certain aspects of the technology are presented below in certain claim forms reduce the number of claims, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A non-transitory computer-readable medium whose contents, when executed by a computing system of a first vehicle, cause the computing system to perform a method, the method comprising:
   receiving, at a blockchain node within the computing system of the first vehicle, a message from a second vehicle within a vicinity of the first vehicle,
      wherein the message from the second vehicle includes information associated with a route currently traveled by the second vehicle;
   determining, via a blockchain operation performed by the blockchain node within the computing system of the first vehicle, whether the second vehicle is verified on a blockchain of a telecommunications network that facilitates communications between the first vehicle and the second vehicle; and
   responsive to the second vehicle being verified by the blockchain operation, performing an action by the computing system of the first vehicle based on the information associated with the route currently traveled by the second vehicle.

2. The non-transitory computer-readable medium of claim 1, wherein the method further comprises:
   responsive to the second vehicle being determined to not be verified by the blockchain operation:
      retrieving route information from other sources; and
      performing the action associated with the first vehicle based on the information associated with the route currently traveled by the second vehicle and retrieved from the other sources.

3. The non-transitory computer-readable medium of claim 1, wherein the method further comprises:
   responsive to the second vehicle being determined to not be a verified by the blockchain operation, pausing performance of an action associated with the first vehicle based on the information associated with the route currently traveled by the second vehicle until the information is confirmed by an additional source of information.

4. The non-transitory computer-readable medium of claim 1, wherein the blockchain node within the computing system of the first vehicle includes a Javascript script that acts as a blockchain agent for the computing system that is configured to operate as a distributed node for the blockchain of the telecommunications network.

5. The non-transitory computer-readable medium of claim 1, wherein the method further comprises:
   performing, by the blockchain node within the computing system of the first vehicle, a transaction to the blockchain that includes a hash of a previous block in the blockchain, a timestamp for the transaction, and transaction data that identifies the action performed by the first vehicle and information identifying the second vehicle that sent the message.

6. The non-transitory computer-readable medium of claim 1, wherein determining, via the blockchain operation performed by the blockchain node, whether the second vehicle is verified on the blockchain includes comparing contents of the message received from the second vehicle with contents of one or more previous messages transmitted from the second vehicle and contained by the blockchain.

7. The non-transitory computer-readable medium of claim 1, wherein determining, via the blockchain operation performed by the blockchain node, whether the second vehicle is verified on the blockchain includes comparing identification information for the second vehicle within contents of the message received from the second vehicle with identification information within contents of previous messages transmitted from the second vehicle and contained by the blockchain.

8. The non-transitory computer-readable medium of claim 1, wherein determining, via the blockchain operation performed by the blockchain node, whether the second vehicle is verified on the blockchain includes determining that the second vehicle is verified when information within the message matches information contained by transactions of the blockchain that are associated with the second vehicle.

9. The non-transitory computer-readable medium of claim 1, wherein the information associated with the route currently traveled by the second vehicle includes information identifying a current traffic condition along the route currently traveled by the second vehicle.

10. The non-transitory computer-readable medium of claim 1, wherein the first vehicle and the second vehicle are autonomous vehicles, and wherein the information associated with the route currently traveled by the second vehicle includes lane assist information.

11. The non-transitory computer-readable medium of claim 1, wherein the first vehicle and the second vehicle are autonomous vehicles, and wherein the information associated with the route currently traveled by the second vehicle includes intersection movement assist information.

12. The non-transitory computer-readable medium of claim 1, wherein the first vehicle and the second vehicle are autonomous vehicles, and wherein the information associated with the route currently traveled by the second vehicle includes left turn assist information.

13. The non-transitory computer-readable medium of claim 1, wherein performing the action associated with the first vehicle based on the information associated with the route currently traveled by the second vehicle includes causing the first vehicle to decelerate.

14. The non-transitory computer-readable medium of claim 1, wherein performing the action associated with the first vehicle based on the information associated with the route currently traveled by the second vehicle includes causing the first vehicle to accelerate.

15. The non-transitory computer-readable medium of claim 1, wherein performing the action associated with the first vehicle based on the information associated with the route currently traveled by the second vehicle includes causing the first vehicle to change lanes.

16. The non-transitory computer-readable medium of claim 1, wherein performing the action associated with the first vehicle based on the information associated with the route currently traveled by the second vehicle includes modifying a GPS planned route of travel for the first vehicle.

17. A method performed by a telecommunications network, the method comprising:
 receiving, at a blockchain node within a computing system of a vehicle, a message from a device within a vicinity of the vehicle,
  wherein the device is not within the vehicle;
 determining, via a blockchain operation performed by the blockchain node within the computing system of the vehicle, whether the device is verified on a blockchain of the telecommunications network,
  wherein the telecommunications network facilitates communications between the vehicle and the device; and
 responsive to the device being verified by the blockchain operation, performing an action by the computing system of the vehicle based on the message received from the device.

18. The method of claim 17, further comprising:
 responsive to the device being determined not to be verified by the blockchain operation:
  retrieving information from other devices within the vicinity of the vehicle; and
  performing the action associated with the vehicle based on the information retrieved from the other devices.

19. The method of claim 17, wherein the device is operating to control travel of vehicles within the vicinity of the vehicle.

20. A system within a connected area network of an autonomous vehicle, the system comprising:
 a blockchain node that determines, based on information maintained by a blockchain of a telecommunications network that facilitates communication between the autonomous vehicle and one or more devices, whether information sent to the autonomous vehicle from the one or more devices in a vicinity of the autonomous vehicle is trustworthy information;
 at least one hardware processor; and
 at least one non-transitory memory, coupled to the at least one hardware processor and storing instructions, which when executed by the at least one hardware processor, perform a process, the process comprising:
  performing of an action at the autonomous vehicle in response to the information from the one or more devices when the blockchain node determines that the information is trustworthy.

* * * * *